United States Patent
Minato et al.

(10) Patent No.: US 10,562,415 B2
(45) Date of Patent: Feb. 18, 2020

(54) SEAT APPARATUS

(71) Applicant: HONDA MOTOR CO., LTD., Minato-ku, Tokyo (JP)

(72) Inventors: Muneatsu Minato, Wako (JP); Hajime Ishihara, Wako (JP); Kenta Hirayama, Wako (JP); Manabu Matsumoto, Wako (JP); Yosuke Nishimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 25 days.

(21) Appl. No.: 15/943,895

(22) Filed: Apr. 3, 2018

(65) Prior Publication Data
US 2018/0290563 A1 Oct. 11, 2018

(30) Foreign Application Priority Data
Apr. 10, 2017 (JP) ................. 2017-077685

(51) Int. Cl.
- *B60N 2/07* (2006.01)
- *B60N 2/08* (2006.01)
- *B60N 2/02* (2006.01)
- *G05D 1/02* (2020.01)

(52) U.S. Cl.
CPC ......... *B60N 2/0727* (2013.01); *B60N 2/0276* (2013.01); *B60N 2/0887* (2013.01); *B60N 2002/0268* (2013.01); *G05D 1/0248* (2013.01); *G05D 1/0257* (2013.01)

(58) Field of Classification Search
CPC .. B60N 2/0727; B60N 2/0244; B60N 2/0276; B60N 2/06; B60N 2/067; B60N 2/0887; B60N 2002/0268; G05D 1/0248; G05D 1/0257

USPC ................................................ 701/49
See application file for complete search history.

(56) References Cited

U.S. PATENT DOCUMENTS

2011/0172886 A1* 7/2011 Taira ................. A61G 5/04
701/49

FOREIGN PATENT DOCUMENTS

| JP | 2008-137551 | 6/2008 |
| JP | 2010-076553 | 4/2010 |
| JP | 2013-123971 | 6/2013 |

OTHER PUBLICATIONS

Japanese Office Action for Japanese Patent Application No. 2017-077685 dated Dec. 4, 2018.

* cited by examiner

*Primary Examiner* — Gertrude Arthur Jeanglaude

(74) *Attorney, Agent, or Firm* — Amin, Turocy & Watson, LLP

(57) ABSTRACT

A seat apparatus includes: a seat on which a passenger of a vehicle sits; an inputter which is operated by the passenger; a fixer which fixes a position of the seat until the inputter is operated by the passenger and allows the position of the seat to be movable in a longitudinal direction of the vehicle when the inputter is operated by the passenger; and a restrictor which restricts the movement of the seat when a predetermined condition related to a traveling state of the vehicle or an external environment of the vehicle is satisfied in comparison with a case in which the predetermined condition is not satisfied.

8 Claims, 13 Drawing Sheets

SEAT APPARATUS

CROSS-REFERENCE TO RELATED APPLICATION

This application is based upon and claims the benefit of priority from Japanese Patent Application No. 2017-077685, filed on Apr. 10, 2017, the entire contents of which are incorporated herein by reference.

BACKGROUND

Field of the Invention

The present invention relates to a seat apparatus.

Description of Related Art

Hitherto, a technology of adjusting a position of a seat disposed in a vehicle by operating a slide lever or the like is known (for example, see Japanese Unexamined Patent Application, First Publication No. 2013-123971 A).

SUMMARY

However, in a related art, there is a case in which a seat moves rapidly when a vehicle travels on a slope or the like or is suddenly accelerated or decelerated at a time at which a position of the seat is adjusted.

An aspect of the present invention is contrived in consideration of such circumstances, and an object thereof is to provide a seat apparatus capable of suppressing momentum when a seat moves.

The seat apparatus according to the present invention adopts the following configuration.

(1) A seat apparatus according to an aspect of the present invention includes: a seat on which a passenger of a vehicle sits; an inputter (operation device) which is operated by the passenger; a fixer which fixes a position of the seat until the inputter is operated by the passenger and allows the position of the seat to be movable in a longitudinal direction of the vehicle when the inputter is operated by the passenger; and a restrictor which restricts the movement of the seat when a predetermined condition related to a traveling state of the vehicle or an external environment of the vehicle is satisfied in comparison with a case in which the predetermined condition is not satisfied.

(2) In the aspect of (1), the restrictor restricts the movement of the seat when the predetermined condition is satisfied and does not restrict the movement of the seat when the predetermined condition is not satisfied.

(3) In the aspect of (1), the predetermined condition includes one or both of a condition in which an acceleration of the vehicle or the seat is greater than or equal to a predetermined value and a condition in which a speed of the vehicle is greater than or equal to a predetermined speed.

(4) In the aspect of (1), the predetermined condition includes a condition in which an inclination angle of the vehicle is greater than or equal to a predetermined angle.

(5) In the aspect of (1), the seat apparatus further includes a predictor which predicts a location at which the predetermined condition will be satisfied on a route on which the vehicle is scheduled to travel in the future, and the restrictor restricts the movement of the seat when the vehicle reaches the vicinity of the location predicted by the predictor.

(6) In the aspect of (1), the seat apparatus further includes a switching controller which switches a vehicle driving mode to any one of an automated driving mode in which at least one of a vehicle steering operation and a vehicle speed acceleration and deceleration operation is controlled and a manual driving mode in which both the vehicle steering operation and the vehicle speed acceleration and deceleration operation are controlled by an operation of the passenger, and the restrictor does not restrict the movement of the seat in comparison to the case in which the predetermined condition is not satisfied even when the predetermined condition is satisfied when the driving mode is switched from the automated driving mode to the manual driving mode by the switching controller.

(7) In the aspect of (1), the seat apparatus further includes: a return switch which is installed at a position different from the inputter; and a movement controller which allows the position of the seat to be movable in the longitudinal direction of the vehicle and moves the position of the seat to a predetermined position by controlling the fixer when the return switch is operated, and the restrictor does not restrict the movement of the seat in comparison to the case in which the predetermined condition is not satisfied even when the predetermined condition is satisfied while the seat is being moved by the movement controller.

(8) In the aspect of (7), the return switch is installed within the reach of a hand of the passenger who sitting on the seat while a backrest of the seat is tilted toward a rear side of the vehicle.

According to any one aspect of (1) to (8), since the seat apparatus restricts the movement of the seat in comparison to a case in which a predetermined condition related to the traveling state of the vehicle or the external environment of the vehicle is not satisfied when the predetermined condition is satisfied, it is possible to suppress momentum when the seat is moved.

DESCRIPTION OF EMBODIMENTS

Hereinafter, embodiments of a seat apparatus of the present invention will be described with reference to the drawings.

First Embodiment

Figure 1:
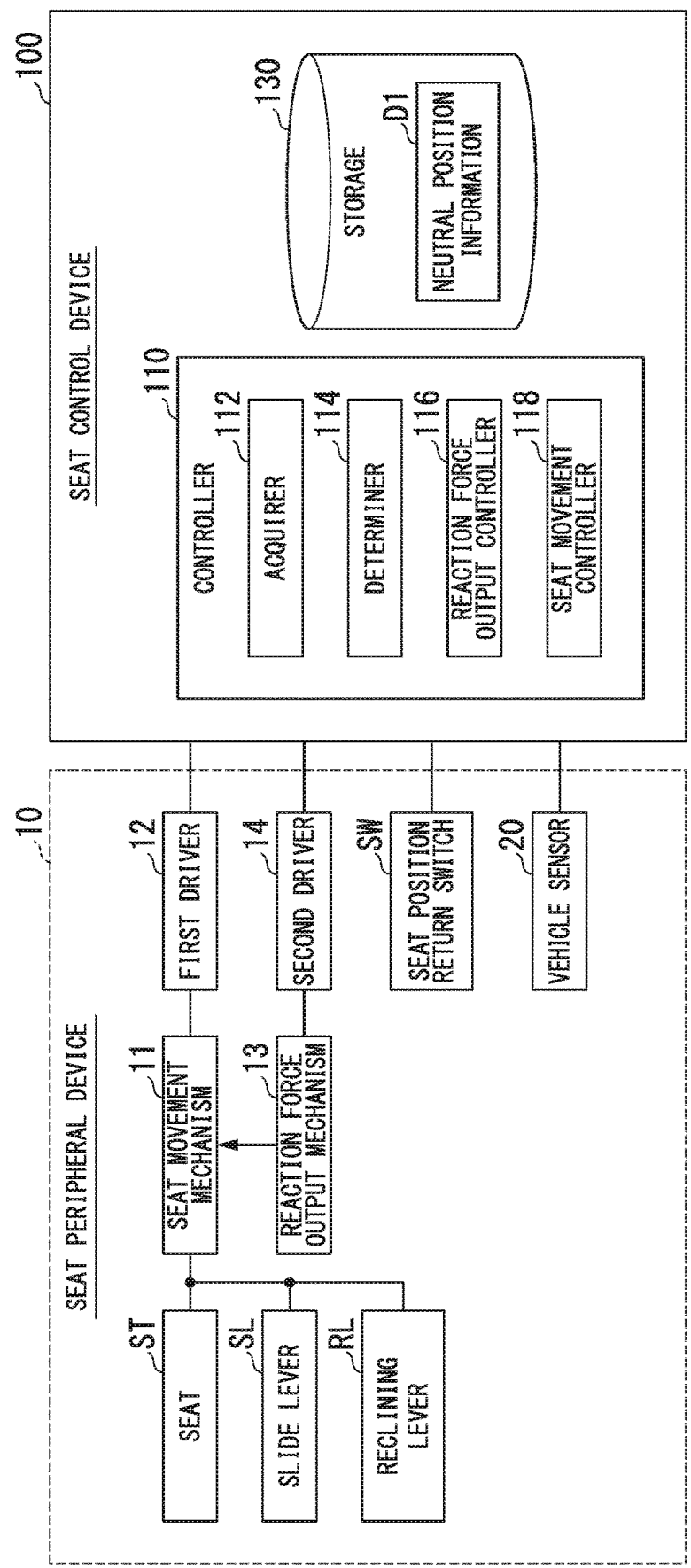
FIG. 1 is a configuration diagram of a seat apparatus of a first embodiment.

FIG. 1 is a configuration diagram of a seat apparatus 1 of a first embodiment. The seat apparatus 1 of the first embodiment is mounted on, for example, a vehicle (hereinafter, referred to as an own vehicle M or subject vehicle M) which is steered and accelerated or decelerated only by a manual operation of a driver. For example, the own vehicle M is a vehicle such as a three-wheeled vehicle or a four-wheeled vehicle, and a driving source thereof is an internal-combustion engine such as a diesel engine or a gasoline engine, an electric motor, or a combination thereof. The electric motor is operated using electric power generated by a generator connected to the internal-combustion engine or discharge power generated by a secondary battery or a fuel cell. In addition to the seat apparatus 1, the own vehicle M may be equipped with a driving support apparatus that executes lane keeping control, constant speed cruise control, and following cruise control.

The seat apparatus 1 of the first embodiment includes, for example, a seat peripheral device 10 and a seat control device 100 which controls the seat peripheral device 10. The seat peripheral device 10 includes, for example, a seat ST, a slide lever SL, a reclining lever RL, a seat movement mechanism 11, a first driver 12, a reaction force output mechanism 13, a second driver 14, a seat position return switch SW, and a vehicle sensor. The slide lever SL is an example of an "inputter." The seat movement mechanism 11 is an example of a "fixer."

The seat ST is a seat on which a passenger of the own vehicle M can sit. The slide lever SL is an operation member for adjusting a position of the seat ST in a direction in which the own vehicle M travels. Hereinafter, the slide lever SL will be described as an operation member for adjusting the position of the seat ST in a "longitudinal direction" while a front side of the own vehicle M is referred to as a "front" and the rear side of the own vehicle M is referred to as a "rear."

For example, the slide lever SL keeps a fixed state (hereinafter, referred to as a locked state) in which the position of the seat ST does not move until the slide lever is operated by the passenger and sets a state (hereinafter, referred to as an unlocked state) in which the seat ST is movable when the slide lever is operated by the passenger. The reclining lever RL is an operation member for adjusting a reclining angle (position) of the seat ST. At least one slide lever SL and one reclining lever RL are provided in each seat ST.

The seat movement mechanism 11 includes, for example, a seat rail R for moving the seat ST in the longitudinal direction or a link lining adjuster for adjusting the reclining angle of a seat back, which is a backrest member of the seat ST.

The first driver 12 is, for example, an actuator such as a motor and is used to change the position or posture (the reclining angle) of the seat ST by driving the seat movement mechanism 11 under control of the seat control device 100.

The reaction force output mechanism 13 includes, for example, a damper (shock absorber) DP or the like for suppressing momentum when the seat ST is moved. The damper DP is, for example, a rotary damper or a cylinder damper using a non-compressible fluid such as an oil or an elastic member such as a spring. For example, the damper DP is provided so that one end is fixed to a floor or the like of a vehicle interior and the other end is in contact with a pedestal. It is desirable for the damper DP to be provided at each of front and rear sides of the seat ST to suppress forward movement and backward movement of the seat ST.

The reaction force output mechanism 13 may include a switching mechanism (for example, a clutch mechanism) for connecting or separating the damper DP to or from the seat ST. In this case, the reaction force output mechanism 13 switches the connection or separation of the damper DP in response to whether a predetermined condition related to external environment of the vehicle or a traveling state of the vehicle is satisfied. The predetermined condition related to the traveling state of the vehicle or the external environment of the vehicle will be described later.

For example, the reaction force output mechanism 13 separates the damper DP from the seat ST when the predetermined condition is not satisfied, and connects the damper DP to the seat ST when the predetermined condition is satisfied.

The second driver 14 is, for example, an actuator such as a motor and is used to output a reaction force by driving the reaction force output mechanism 13 under control of the seat control device 100. The reaction force refers to a force which pushes the seat ST back via the damper DP, for example, when the seat ST is moved in the longitudinal direction such that a pressure is applied to the damper DP. For example, when the damper DP is a cylinder damper, the second driver 14 rotates an electromagnetic valve provided inside the cylinder to adjust a flow rate of a liquid (for example, an oil) flowing into a flow passage called an orifice or a port to change a viscous resistance of the liquid filled in the cylinder. Accordingly, a force required to move a piston rod into or out of the cylinder changes. In this way, the second driver 14 outputs a reaction force (a resistance force) when the seat ST is moved in the longitudinal direction by adjusting a force increase/decrease degree (state) in a direction opposite a direction of a force applied to the damper DP (a pressure applied from the seat ST).

The seat position return switch SW is an operation member for returning the position and the reclining angle of the seat ST in the longitudinal direction to a predetermined position and a predetermined angle (hereinafter, the position and the angle will be referred to as a neutral position). For example, the seat position return switch SW is installed within the reach of a hand while a passenger on the seat ST is in contact with the seat back via his or her back after the seat back is tilted backward. As an installation position included in such a range, for example, the seat position return switch SW is installed at a side support provided at both sides of a seat cushion, which is a seat surface portion of the seat ST. When the seat position return switch SW is operated, a predetermined operation signal is output to the seat control device 100.

The vehicle sensor 20 includes a vehicle speed sensor which detects the speed V of the own vehicle M, an acceleration sensor which detects an acceleration α of the own vehicle M, a yaw rate sensor which detects an angular velocity about a vertical axis, an orientation sensor which detects an orientation direction of the own vehicle M, an inclination angle sensor which detects an inclination (an inclination angle θ) of the own vehicle M in a vertical direction with respect to a horizontal direction, and the like. The acceleration α includes, for example, an acceleration (hereinafter, referred to as a longitudinal acceleration) in a traveling direction of the own vehicle M or an acceleration (hereinafter, referred to as a lateral acceleration) in a vehicle width direction which is orthogonal to the traveling direction of the own vehicle M and parallel to a road. The vehicle sensor 20 may separately include a sensor for detecting the acceleration α or an angular acceleration of the seat ST. Various sensors included in the vehicle sensor 20 output detection signals representing detection results to the seat control device 100.

Figure 2:
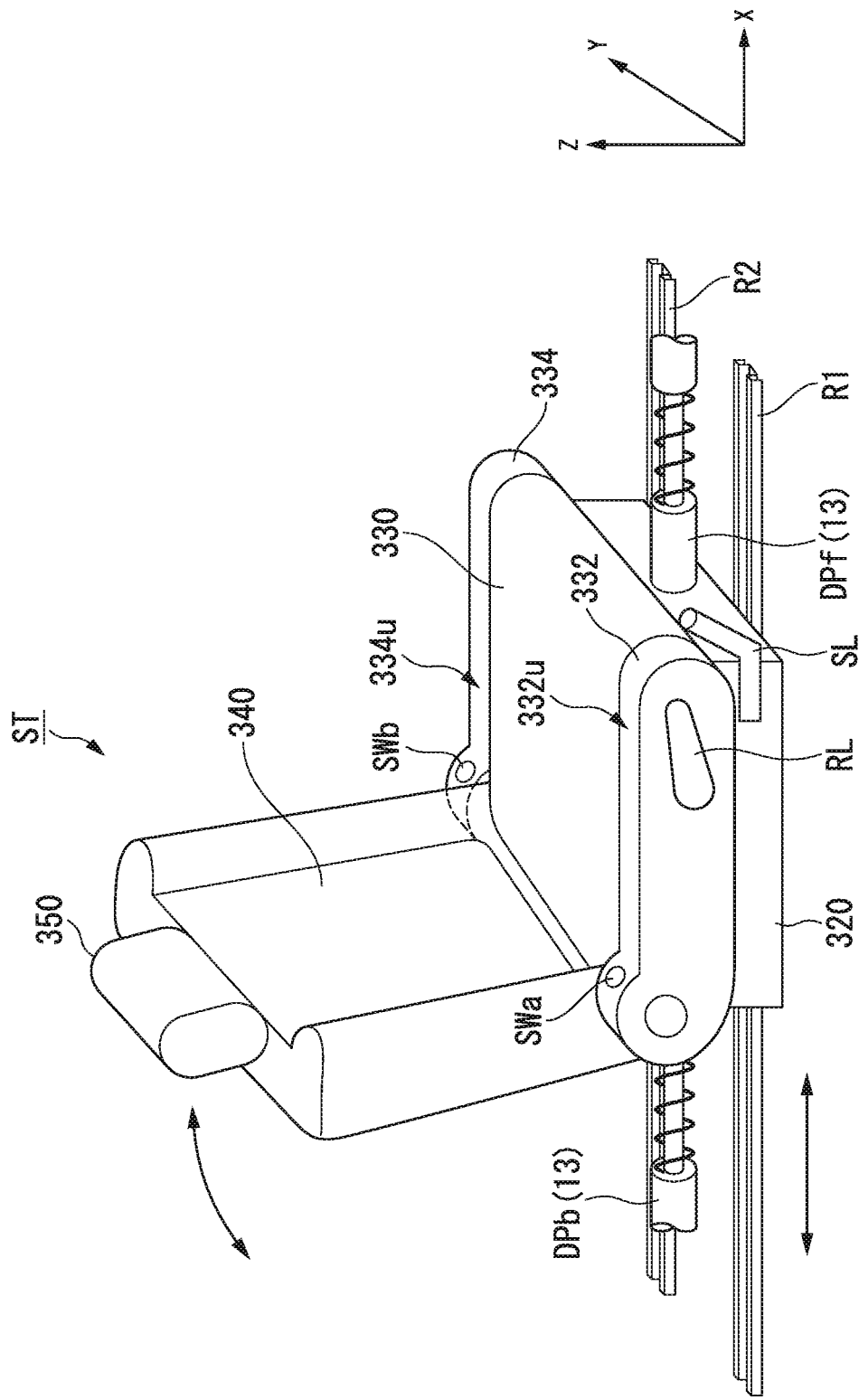
FIG. 2 is a diagram showing an example of an appearance of a seat.

FIG. 2 is a diagram showing an example of the seat ST. In the drawing, the X axis indicates the traveling direction (the longitudinal direction) of the own vehicle M, the Y axis indicates the vehicle width direction orthogonal to the X axis and the Z axis, and the Z axis indicates a vertical direction orthogonal to the X axis and the Y axis. As shown in the drawings, for example, two seat rails R1 and R2 are installed at each of a driver seat and a passenger seat, and a pedestal 320 is installed to slide on these seat rails R. A seat cushion 330 for supporting a seated passenger from below is provided on the pedestal 320, and side supports 332 and 334 are respectively provided at both sides of the seat cushion 330. The pedestal 320 or the side supports 332 and 334 are provided with the slide lever SL and the reclining lever RL. Seat position return switches SWa and SWb may be respectively provided on a surface 332u of the side support 332 and a surface 334u of the side support 334. A seat back 340, which supports the seated passenger from behind, is provided in the seat cushion 330 to be rotatable at least forward and backward. The seat back 340 is provided with a headrest 350 for supporting the head or the like of the seated passenger from behind. In the damper DP of the reaction force output mechanism 13, one end of a front damper DPf of the seat ST is provided to be in contact with a front side surface of the pedestal 320, and the other end is fixed to a floor provided with the seat rail R. One end of a rear damper DPb of the seat ST is provided to be in contact with a rear side surface of the pedestal 320, and the other end is fixed to the floor provided with the seat rail R.

Figure 3:
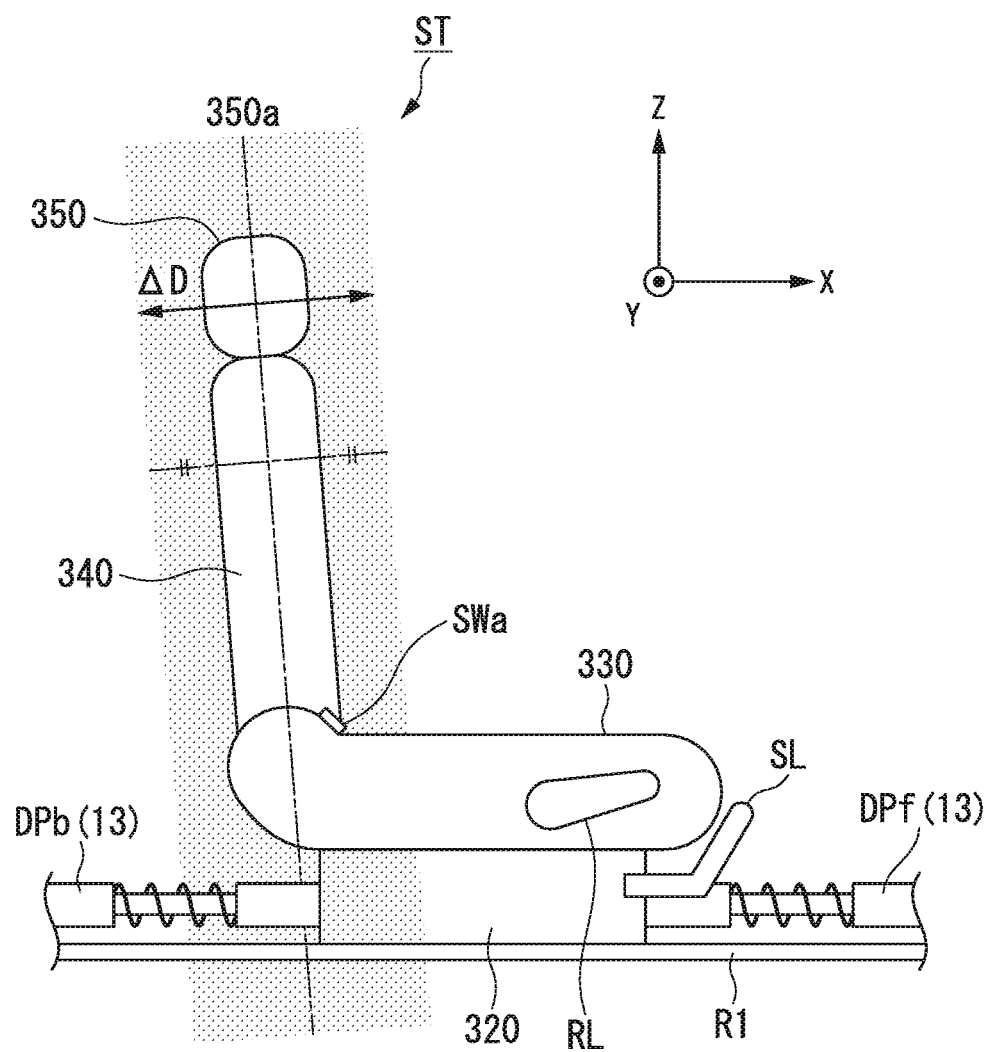
FIG. 3 is a diagram showing an example of an appearance of the seat when viewed from a side.

FIG. 3 is a diagram showing an example of the seat ST when viewed from a side. For example, each seat position return switch SW is installed at the side support 332 within the range of a predetermined width ΔD from a center line 350a of a thickness of the seat back 340 (a width in the X direction of the drawing) considering the thickness. The predetermined width ΔD indicates, for example, a width within which the passenger seated on the seat cushion 330 stretches his or her hand to come into contact with the seat position return switch SW. The predetermined width ΔD may be determined empirically (statistically) by a plurality of passengers actually sitting on the seat cushion 330, or may be determined by simulation.

Here, a description will be made by returning to FIG. 1. The seat control device 100 includes, for example, the controller 110 and a storage 130. The controller 110 includes, for example, an acquirer 112, a determiner 114, a reaction force output controller 116, and a seat movement controller 118. A combination of the reaction force output mechanism 13, the second driver 14, and the reaction force output controller 116 is an example of a "restrictor."

Some or all of the components of the controller 110 are realized by executing a program (software) via a processor such as a central processing unit (CPU). Some or all of the components of the controller 110 may be realized by hardware such as a large scale integration (LSI), an application specific integrated circuit (ASIC), and a field-programmable gate array (FPGA) or cooperation between software and hardware. The program which is executed by the processor may be stored in the storage 130 in advance, or may be downloaded from an external device via an in-vehicle internet facility or the like. Additionally, the program may be stored in a removable storage medium such as a DVD, a compact disc (CD), an SD card, a universal serial bus (USB) memory, and an magnetoresistive random access memory (MRAM) and may be installed in the storage 130 when the storage medium is attached to an in-vehicle drive device.

The storage 130 is realized by, for example, a storage device such as a hard disk drive (HDD), a flash memory, a random access memory (RAM), and a read only memory (ROM). The storage 130 stores neutral position information D1 and the like in addition to the program to be referred to by the processor.

The neutral position information D1 is information which represents the neutral position of each of the seats ST provided in the own vehicle M. For example, when the seat ST is a driver seat, a position or reclining angle of the seat ST when a driver takes a posture which keeps easy driving is stored as the neutral position information D1.

Figure 4:
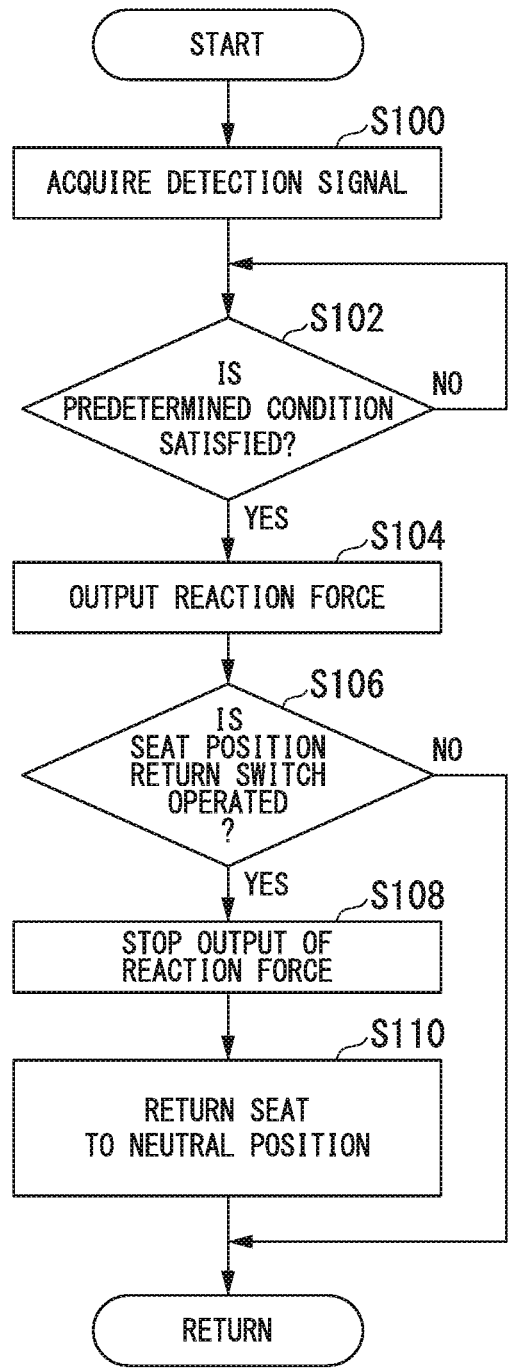
FIG. 4 is a flowchart showing a flow of a series of processes executed by a controller of the first embodiment.

Hereinafter, a process which is repeatedly executed by the controller 110 will be described according to a flowchart. FIG. 4 is the flowchart showing a flow of a series of processes which are executed by the controller 110 of the first embodiment. The processes of the flowchart may be executed at a predetermined cycle.

First, the acquirer 112 acquires a detection signal from each of sensors included in the vehicle sensor 20 (step S100). When an operation signal is output by the seat position return switch SW, the acquirer 112 acquires the operation signal.

Next, the determiner 114 determines whether a predetermined condition related to an external environment of the vehicle or a traveling state of the vehicle is satisfied on the basis of the detection signal acquired by the acquirer 112 (step S102). The predetermined condition related to the traveling state of the vehicle or the external environment of the vehicle includes at least one of (1) a condition in which an absolute value of the acceleration α of the own vehicle M or the seat ST is greater than or equal to a predetermined value, (2) a condition in which an absolute value of the speed V of the own vehicle M is greater than or equal to a predetermined speed, and (3) a condition in which an absolute value of an inclination angle θ of the own vehicle M is greater than or equal to a predetermined angle. For example, when all of the conditions (1) to (3) are included as the predetermined condition, the determiner 114 determines that the predetermined condition is satisfied when at least one of the conditions (1) to (3) is satisfied and determines that the predetermined condition is not satisfied when all of the conditions (1) to (3) are not satisfied.

For example, when the condition (1) or (2) related to the traveling state of the vehicle is satisfied, it can be determined that the own vehicle M is suddenly accelerated or decelerated. For example, when the acceleration side is set as a positive value and the deceleration side is set as a negative value, it can be determined that the own vehicle M is suddenly accelerated when the absolute value of the speed V or the acceleration α having a positive value is greater than or equal to the predetermined value. In this case, when the slide lever SL is operated to unlock the seat ST, there are some cases in which the seat ST moves backward due to an inertial force even if there is no operation of the passenger.

When the absolute value of the speed V or the acceleration α having a negative value is greater than or equal to the predetermined value, it can be determined that the own vehicle M has suddenly decelerated. In this case, when the slide lever SL is operated to unlock the seat ST, there are some cases in which the seat ST moves forward due to an inertial force even if there is no operation of the passenger.

When the condition (3) related to the external environment of the vehicle is satisfied, it can be determined that the own vehicle M travels on an uphill slope or downhill slope. For example, when a vertical upward direction is set as a positive value and a vertical downward direction is set as a negative value, it can be determined that the own vehicle M travels on an uphill slope when the absolute value of the inclination angle θ having a positive value is greater than or equal to the predetermined angle. In this case, when the slide lever SL is operated to unlock the seat ST, there are some cases in which the seat ST moves backward due to gravity even if there is no operation by the passenger. When the absolute value of the inclination angle θ having a negative value is greater than or equal to the predetermined angle, it can be determined that the own vehicle M travels on a downhill slope. In this case, when the slide lever SL is operated to unlock the seat ST, there are some cases in which the seat ST moves forward due to gravity even if there is no operation by the passenger.

In this way, in the case of an environment which is easily influenced by an inertial force or gravity, that is, an environment in which the predetermined condition related to the traveling state of the vehicle or the external environment of the vehicle is satisfied, it is assumed that the seat ST unexpectedly moves without operation of the passenger or a movement speed at a time at which the seat ST is moved is accelerated. For that reason, in the first embodiment, the reaction force output controller 116 outputs a reaction force related to the movement of the seat ST to restrict sudden movement of the unlocked seat ST.

When the determiner 114 determines that the predetermined condition is satisfied, the reaction force output controller 116 controls the second driver 14 to output a reaction force to the damper DP of the reaction force output mechanism 13 (step S104). For example, when the determiner 114 determines that the predetermined condition is satisfied after the absolute value of the speed V or the acceleration α having a positive value is greater than or equal to the predetermined value or the predetermined condition is satisfied after the absolute value of the inclination angle θ having a positive value is greater than or equal to the predetermined angle, the reaction force output controller 116 outputs a reaction force to the damper DPb provided at the rear side of the seat ST.

More specifically, when the predetermined condition is satisfied, the reaction force output controller 116 outputs (transmits) a reaction force generated by the damper DPb to the seat ST by controlling the second driver 14 so that the switching mechanism of the reaction force output mechanism 13 is driven and the damper DPb is connected to the seat ST. The reaction force output controller 116 may output a larger reaction force than in a case in which the predetermined condition is not satisfied by controlling the electromagnetic valve of the damper DPb to increase the viscous resistance after connecting the damper DPb to the seat ST. Accordingly, it is possible to prevent a problem in which the unlocked seat ST unexpectedly moves backward when the vehicle is accelerated or travels on an uphill slope.

When the determiner 114 determines that the predetermined condition is satisfied after the absolute value of the speed V or the acceleration α having a negative value is greater than or equal to the predetermined value or the predetermined condition is satisfied after the absolute value of the inclination angle θ having a negative value is greater than or equal to the predetermined angle, the reaction force output controller 116 outputs a reaction force to the damper DPf provided at the front side of the seat ST.

More specifically, when the predetermined condition is satisfied, the reaction force output controller 116 outputs (transmits) a reaction force generated by the damper DPf to the seat ST by controlling the second driver 14 so that the switching mechanism of the reaction force output mechanism 13 is driven and the damper DPf is connected to the seat ST. The reaction force output controller 116 may output a larger reaction force than in a case in which the predetermined condition is not satisfied by controlling the electromagnetic valve of the damper DPf to increase the viscous resistance after connecting the damper DPf to the seat ST. Accordingly, it is possible to prevent a problem in which the unlocked seat ST unexpectedly moves forward when the vehicle is decelerated or travels on a downhill slope.

When the determiner 114 determines that the predetermined condition is not satisfied, the reaction force output controller 116 stops or decreases the output of the reaction force generated by the damper DP. For example, when the predetermined condition is not satisfied, the reaction force output controller 116 does not output (transmit) the reaction force generated by the damper DP to the seat ST by controlling the second driver 14 so that the switching mechanism of the reaction force output mechanism 13 is driven and the damper DP is separated from the seat ST. The reaction force output controller 116 may output a reaction force smaller than in a case in which the predetermined condition is satisfied by controlling the electromagnetic valve of the damper DP to decrease the viscous resistance after connecting the damper DP to the seat ST.

The reaction force output controller 116 may determine a magnitude (strength) of the reaction force in response to the speed V, the acceleration α, or the inclination angle θ to be determined by the determiner 114 at a time at which the reaction force is output to the damper DP of the reaction force output mechanism 13.

Figure 5:
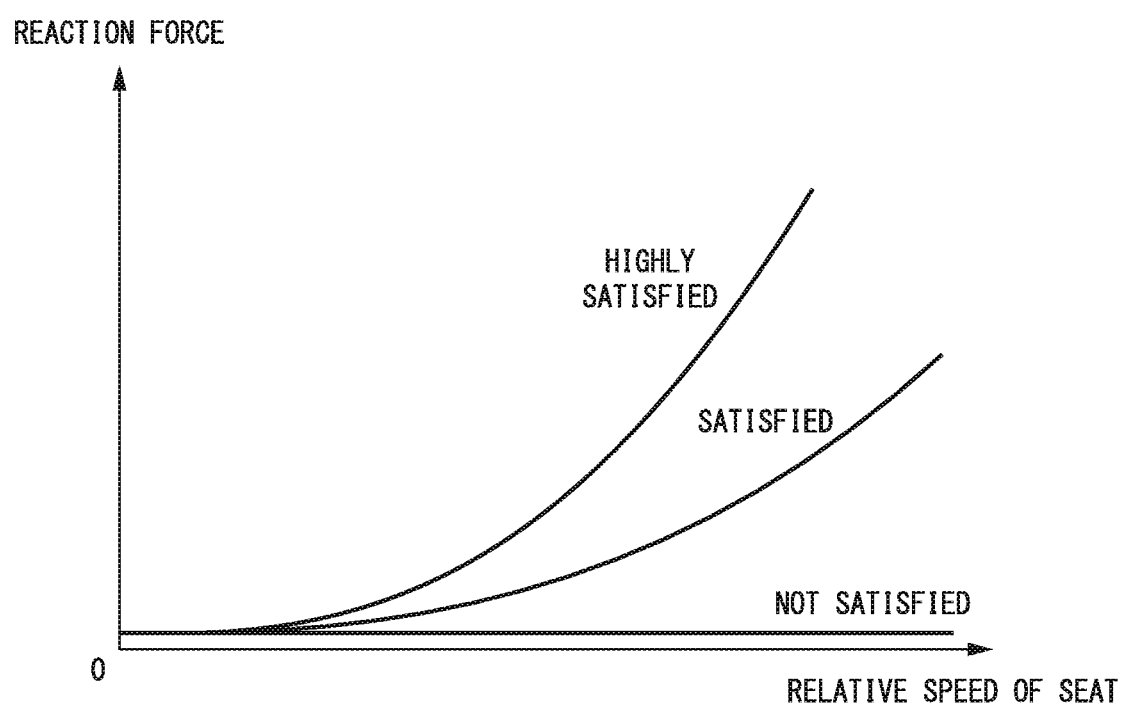
FIG. 5 is a diagram for showing a method of determining a magnitude of a reaction force.

FIG. 5 is a diagram showing a relationship between the reaction force output by the damper DP and a relative movement speed of the seat ST with respect to the own vehicle M. In the drawing, the horizontal axis indicates the relative speed of the seat ST and the vertical axis indicates the reaction force. For example, when the predetermined condition is not satisfied, the reaction force output controller 116 controls the second driver 14 so that a constant reaction force is output to the damper DP if the relative speed of the seat ST increases constantly (at a constant acceleration).

When the predetermined condition is satisfied, the reaction force output controller 116 controls the second driver 14 so that a larger reaction force is output to the damper DP as the relative speed of the seat ST increases. The damper DP may output a constant reaction force in advance in response to the relative speed of the seat ST without being driven by the second driver 14. In this case, the reaction force output controller 116 controls the second driver 14 so that the switching mechanism of the reaction force output mechanism 13 is driven and the damper DP is connected to the seat ST to output the reaction force to the seat ST. As shown in the drawing, the output reaction force does not need to increase nonlinearly, but may increase linearly in response to the relative speed of the seat ST. The reaction force may increase stepwisely.

As in the example shown in the drawing, when the predetermined condition is "highly satisfied," a larger reaction force may be output than in a case in which the condition is simply satisfied. The conditions for "highly satisfied" may be, for example, a case in which two or more of the predetermined conditions (1) to (3) are satisfied or the reaction force is larger than the threshold value of each of the conditions. In the above-described example of FIG. 5, the output of the reaction force in the case in which a condition related to the speed V of the own vehicle M is satisfied has been described, but the present invention is not limited thereto. For example, a larger reaction force may also be output when the condition of the acceleration α and the inclination angle θ is satisfied than in a case in which the condition is not satisfied. With such control, movement of the seat ST can be appropriately restricted according to a degree of acceleration or deceleration of the vehicle M or a degree of inclination of a slope.

Next, the determiner 114 determines whether the seat position return switch SW is operated in response to whether the operation signal of the seat position return switch SW is acquired by the acquirer 112 (step S106).

For example, when the determiner 114 determines that the seat position return switch SW is operated after the acquirer 112 acquires the operation signal of the seat position return switch SW, the reaction force output controller 116 controls the second driver 14 to stop the output of the reaction force generated by the damper DP of the reaction force output mechanism 13 (step S108). The reaction force output controller 116 may simply decrease the reaction force to be output instead of stopping the output of the reaction force.

Next, the seat movement controller 118 returns the position and posture of the seat ST operated by the seat position return switch SW to the neutral position at the same time by controlling the first driver 12 with reference to the neutral position information D1 when the seat ST is unlocked (step S110). Accordingly, the processes of the flowchart end.

Figure 6:
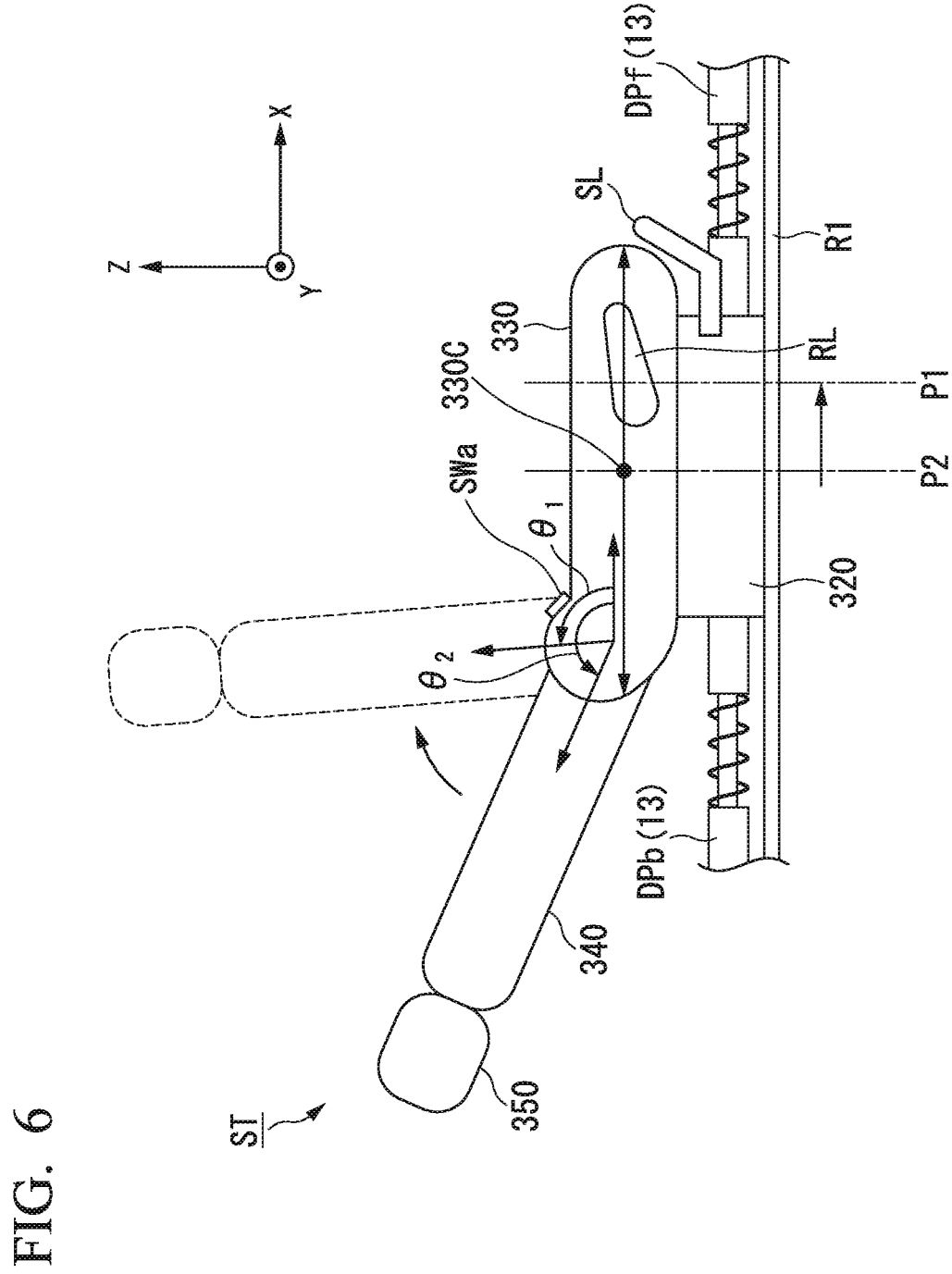
FIG. 6 is a diagram schematically showing a state in which a position and a posture of the seat are returned to a neutral position.

FIG. 6 is a diagram schematically showing a state in which the position and posture of the seat ST are returned to the neutral position. For example, when a position P1 in the longitudinal direction of a reference point 330C related to the center or center of gravity of the seat cushion 330 is defined as the "position of the seat ST at the neutral position" and an angle θ1 formed between the seat cushion 330 and the seat back 340 is determined as the "posture of the seat ST at the neutral position," the seat movement controller 118 controls the first driver 12 so that a current position P2 of the reference point 330C of the seat cushion 330 approaches the position P1 and a current angle θ2 formed between the seat cushion 330 and the seat back 340 approaches the angle θ1. Accordingly, the current position and posture of the seat ST are returned to the position and posture determined at the neutral position.

According to the above-described first embodiment, it is possible to suppress momentum when the seat ST is moved by including the seat ST on which the passenger of the vehicle sits, the slide lever SL which is operated by the passenger, the seat movement mechanism 11 which fixes the position of the seat ST until the slide lever SL is operated by the passenger and allows the position of the seat ST to be movable in the longitudinal direction when the slide lever SL is operated by the passenger, and the reaction force output controller 116 which restricts the movement of the seat ST more than in a case in which the predetermined condition is not satisfied by controlling the second driver 14 so that the reaction force is output to the damper DP of the reaction force output mechanism 13 when the predetermined condition related to the traveling state of the vehicle or the external environment of the vehicle is satisfied.

According to the above-described first embodiment, since the output of the reaction force is stopped or the output reaction force is decreased when the seat position return switch SW is operated, it is possible to promptly return the seat ST to the neutral position without disturbing driving of the actuator of the first driver 12.

Second Embodiment

Hereinafter, a second embodiment will be described. In the above-described first embodiment, the own vehicle M equipped with the seat apparatus 1 has been described as a vehicle of which acceleration or deceleration and steering are controlled only by a manual operation of a driver. On the contrary, in the second embodiment, the own vehicle M will be described as an automated driving vehicle of which acceleration or deceleration and steering are controlled automatically. Hereinafter, a description will be made by focusing on differences from the first embodiment, and a function or the like which is common to the first embodiment will not be described.

Figure 7:
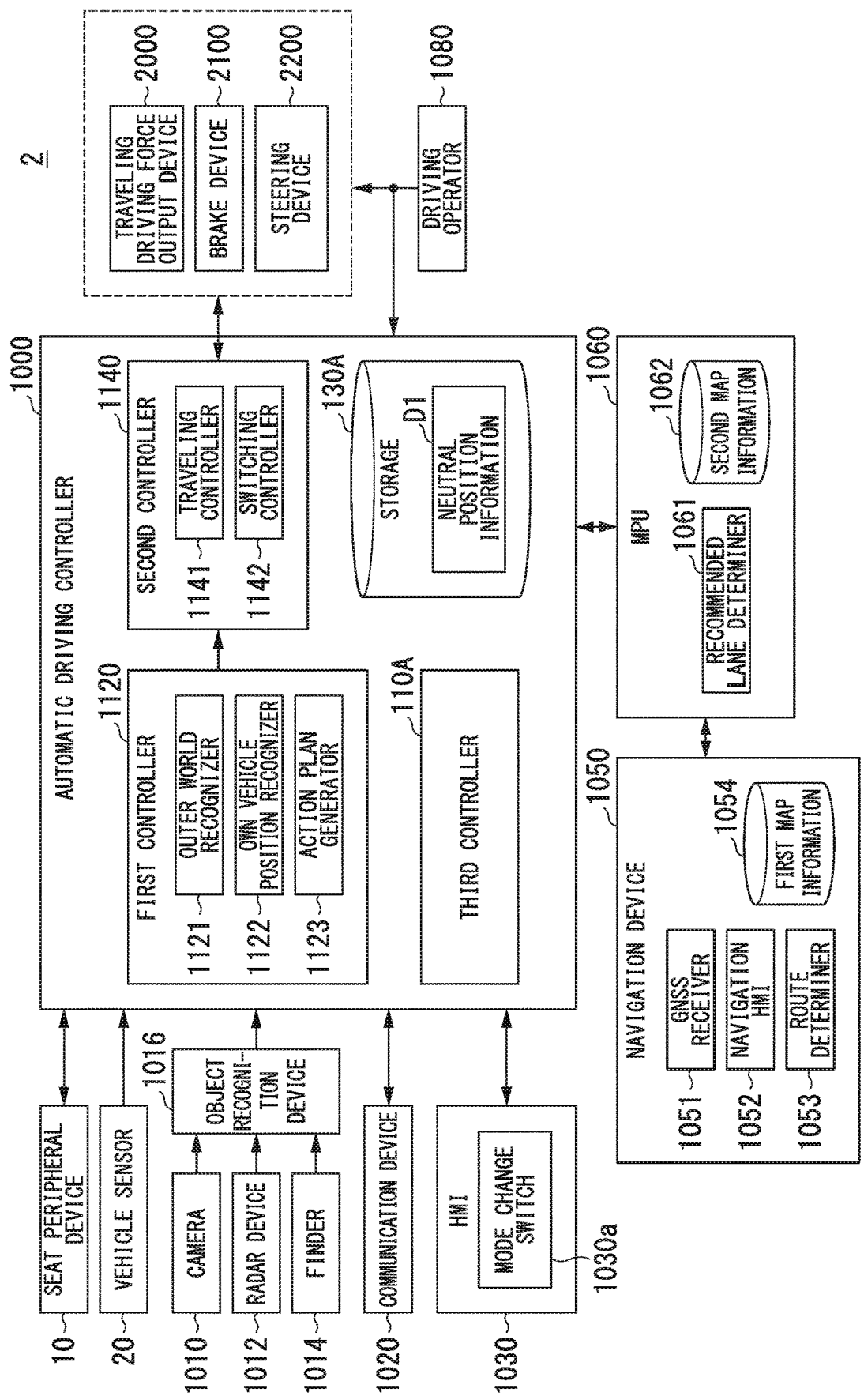
FIG. 7 is a configuration diagram of a vehicle system of a second embodiment.

FIG. 7 is a configuration diagram of a vehicle system 2 of the second embodiment. The vehicle system 2 of the second embodiment has the function of the seat apparatus 1 of the above-described first embodiment. The vehicle system 2 of the second embodiment includes, for example, a seat peripheral device 10, a vehicle sensor 20, a camera 1010, a radar device 1012, a finder 1014, an object recognition device 1016, a communication device 1020, a human machine interface (HMI) 1030, a navigation device 1050, a microprocessing unit (MPU) 1060, a driving operator 1080, an automated driving controller 1000, a traveling driving force output device 2000, a brake device 2100, and a steering device 2200. These devices or units are connected by a multiplex communication line such as a controller area network (CAN) communication line, a serial communication line, and a wireless communication network. The configuration shown in FIG. 7 is merely an example, and a part of the configuration may be omitted or other configurations may be added. For example, the seat peripheral device 10 and the vehicle sensor 20 may be integrated similarly to the first embodiment.

The camera 1010 is, for example, a digital camera which uses a solid-stage imaging device such as a charge coupled device (CCD) or a complementary metal oxide semiconductor (CMOS). One or a plurality of cameras 1010 are attached to an arbitrary position of the own vehicle M equipped with the vehicle system 2. In the case in which the front side is imaged, the camera 1010 is attached to an upper portion of a front windshield, a rear surface of a room mirror, or the like. In the case that the rear side is imaged, the camera 1010 is attached to an upper portion of a rear windshield, a back door, or the like. In the case in which the side is imaged, the camera 1010 is attached to a door mirror or the like. The camera 1010, for example, periodically repeats imaging of the periphery of the vehicle M. The camera 1010 may be a stereo camera.

The radar device 1012 radiates radio waves such as millimeter waves around the own vehicle M and detects at least a position (a distance and a direction) of an object by detecting radio waves (reflected waves) reflected by the object. One or a plurality of radar devices 1012 are attached to an arbitrary position of the own vehicle M. The radar device 1012 may detect the position and speed of the object through a frequency modulated continuous wave (FMCW) method.

The finder 1014 is a light detection and ranging, or laser imaging detection and ranging unit (LIDAR) that measures scattered light with respect to irradiation light and detects the distance to the object. One or a plurality of finders 1014 are attached to an arbitrary position of the own vehicle M.

The object recognition device 1016 performs a sensor fusion process on the detection result obtained by some or all of the camera 1010, the radar device 1012, and the finder 1014 to recognize the position, type, speed, and the like of the object. The object recognition device 1016 outputs a recognition result to the automated driving controller 1000.

The communication device 1020 communicates with other vehicles existing in the vicinity of the own vehicle M by using, for example, a cellular network, a Wi-Fi network, a Bluetooth (registered trademark), a dedicated short range communication (DSRC), or the like, and communicates with various server devices via wireless base stations. The communication device 1020 may communicate with a terminal device such as a smart phone possessed by a person inside and outside the vehicle.

The HMI 1030 presents various kinds of information to the passenger in the vehicle and accepts an input operation by the passenger. The HMI 1030 includes a mode change switch 1030a for changing, for example, an automated driving mode and a manual driving mode, which will be described below. The mode change switch 1030a is operated by the passenger and outputs a switching signal for instructing a change in mode to the automated driving controller 1000. The HMI 1030 may include, for example, various display devices, speakers, buzzers, touch panels, and the like in addition to the mode change switch 1030a.

The navigation device 1050 includes, for example, a global navigation satellite system (GNSS) receiver 1051, a navigation HMI 1052, and a route determiner 1053, and stores first map information 1054 in a storage device such as an HDD or a flash memory. The GNSS receiver 1051 specifies the position of the own vehicle M based on a signal received from a GNSS satellite. The position of the own vehicle M may be specified or complemented by an inertial navigation system (INS) using the output of the vehicle sensor 20. The navigation HMI 1052 includes a display device, a speaker, a touch panel, a key, and the like. The navigation HMI 1052 may be partially or entirely shared with the above-described HMI 1030. For example, the route determiner 1053 determines a route (including, for example, information on waypoints when traveling to a destination) from the position of the own vehicle M specified by the GNSS receiver 1051 (or an arbitrary input position) to a destination input by the passenger using the navigation HMI 1052 by referring to the first map information 1054. The first map information 1054 is, for example, information in which a road shape is expressed by a link indicating a road and a node connected by the link. The first map information 1054 may include a curvature of the road, point of interest (POI) information, and the like. A route which is determined by the route determiner 1053 is output to the MPU 1060. The navigation device 1050 may guide the vehicle along the route using the navigation HMI 1052 based on the route determined by the route determiner 1053. The navigation device 1050 may be realized by a function of a terminal device such as a smart phone or a tablet terminal possessed by the user. The navigation device 1050 may transmit a current position and a destination to a navigation server via the communication device 1020 and acquire a route sent back from the navigation server.

The MPU 1060 serves as, for example, a recommended lane determiner 1061 and stores second map information 1062 in a storage device such as an HDD or a flash memory. The recommended lane determiner 1061 divides the route provided from the navigation device 1050 into a plurality of blocks (for example, divides the route every 100 [m] in a vehicle traveling direction) and determines a recommended lane for each of the blocks by referring to the second map information 1062. The recommended lane determiner 1061 determines a number of the lane from the far left lane. The recommended lane determiner 1061 determines the recommended lane so that the own vehicle M can travel on a reasonable traveling route for traveling to a branch destination when there are branch points, merge points, or the like on the route.

The second map information 1062 is map information with higher accuracy than the first map information 1054. The second map information 1062 includes, for example, information on the center of the lane or information on a boundary of the lane. The second map information 1062 may include road information, traffic regulation information, address information (address/zip code), facility information, telephone number information, and the like. The road information includes information indicating types of roads such as expressways, toll roads, national highways, and prefectural roads and information on the number of lanes on the road, an area of an emergency parking zone, a width of each of the lanes, a gradient of the road, a position of the road (three-dimensional coordinates including longitude, latitude, and height), a curvature of a curve of the lane, a position of a junction of lanes and a position of a branch point, a sign provided on the road, and the like. The second map information 1062 may be updated at any time by accessing another device using the communication device 1020.

The driving operator 1080 includes, for example, an accelerator pedal, a brake pedal, a shift lever, a steering wheel, and other operators. A sensor for detecting an operation amount or an operation state is attached to the driving operator 1080, and the detection result is output to one or both of the automated driving controller 1000, the traveling driving force output device 2000, the brake device 2100, and the steering device 2200.

[Automated Driving Controller]

The automated driving controller 1000 includes, for example, a first controller 1120, a second controller 1140, a third controller 110A, and a storage 130A. The third controller 110A has the same function as that of the controller 110 of the seat control device 100 of the first embodiment and the storage 130A stores the neutral position information D1 and the like stored in advance in the storage 130 of the seat control device 100.

Part or all of the first controller 1120, the second controller 1140, and the third controller 110A are realized when a processor such as a CPU executes a program (software). Part or all of these components may be realized by hardware such as LSI, ASIC, and FPGA or may be realized by cooperation of software and hardware. The program executed by the processor may be stored in advance in the storage 130 or may be downloaded from an external device via an in-vehicle internet facility or the like. Further, the program is stored in a removable storage medium such as a DVD, a CD, an SD card, a USB memory, and an MRAM and may be installed in the storage 130A when the storage medium is attached to an in-vehicle drive device.

The first controller 1120 includes, for example, an outer world recognizer 1121, an own vehicle position recognizer 1122, and an action plan generator 1123.

The outer world recognizer 1121 recognizes a position of a peripheral vehicle and states of a speed and an acceleration thereof based on information input from the camera 1010, the radar device 1012, and the finder 1014 via the object recognition device 1016. The position of the peripheral vehicle may be represented by a representative point such as a center of gravity or a corner of the peripheral vehicle, or may be represented by a region indicated by an outline of the peripheral vehicle. The "state" of the peripheral vehicle may include an acceleration or jerk of the peripheral vehicle or a "behavior state" (for example, a state in which the vehicle is changing lanes or is about to change lanes).

The outer world recognizer 1121 may recognize positions of a guard rail, a utility pole, a parked vehicle, a person such as a pedestrian, and other objects in addition to peripheral vehicles.

The own vehicle position recognizer 1122 recognizes, for example, a lane (the traveling lane) in which the own vehicle M travels and a relative position and posture of the own vehicle M with respect to the traveling lane. The own vehicle position recognizer 1122 recognizes a traveling lane by comparing, for example, a pattern of a road lane mark (for example, an arrangement of a solid line and a dashed line) obtained from the second map information 1062 with a pattern of a road lane mark in the periphery of the own vehicle M obtained from an image captured by the camera 1010. The position of the own vehicle M acquired by the navigation device 1050 or the process result obtained by INS may be added to this recognition.

Figure 8:
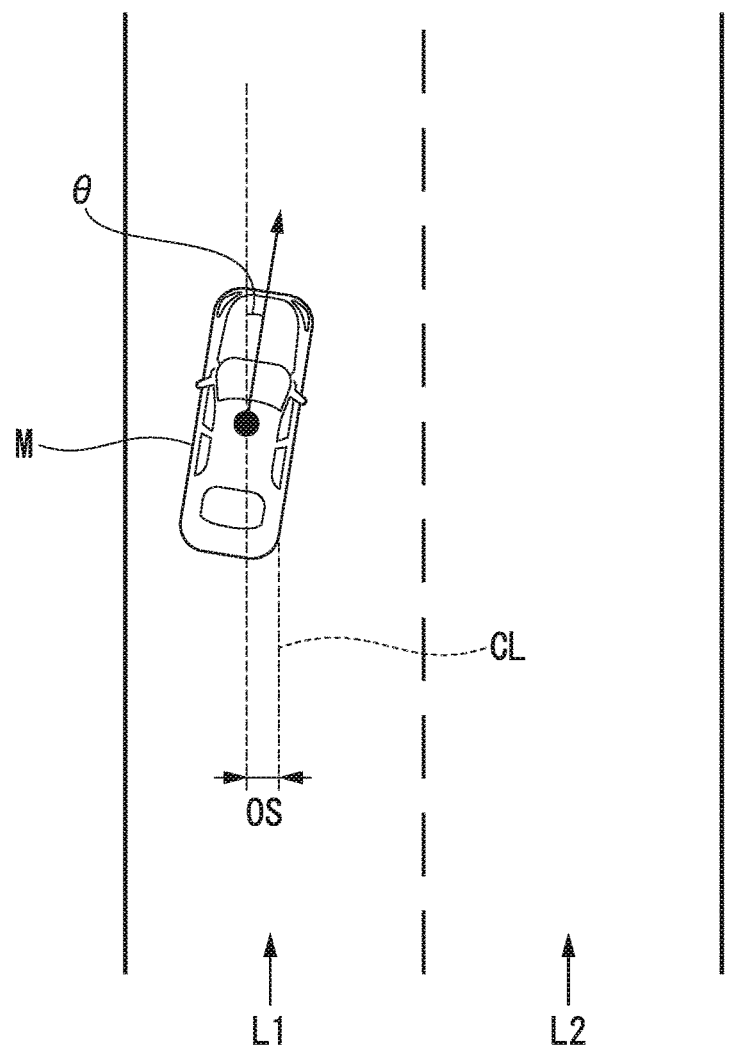
FIG. 8 is a diagram showing a state in which a posture and a relative position of an own vehicle with respect to a traveling lane are recognized by an own vehicle position recognizer.

Then, the own vehicle position recognizer 1122 recognizes, for example, the position or posture of the own vehicle M with respect to the traveling lane. FIG. 8 is a diagram showing a state in which a relative position and posture of the own vehicle M with respect to the traveling lane L1 are recognized by the own vehicle position recognizer 1122. The own vehicle position recognizer 1122 recognizes, for example, a divergence OS formed between the own vehicle M and a traveling lane center CL at a reference point (for example, a center) and an angle θ formed between the own vehicle M in the traveling direction and a line connecting the traveling lane center CL as the relative position and posture of the own vehicle M with respect to the traveling lane L1. Instead of this configuration, the own vehicle position recognizer 1122 may recognize, for example, the position of the reference point of the own vehicle M relative to one of side ends of the traveling lane L1 as the relative position of the own vehicle M with respect to the traveling lane. The relative position of the own vehicle M which is recognized by the own vehicle position recognizer 1122 is provided for the recommended lane determiner 1061 and the action plan generator 1123.

The action plan generator 1123 generates an action plan for performing an automated driving operation of the own vehicle M to a destination or the like. For example, the action plan generator 1123 determines events which are sequentially executed in automated driving control to travel on the recommended lane determined by the recommended lane determiner 1061 and to cope with a peripheral state of the own vehicle M. Events include, for example, a constant-speed traveling event in which the own vehicle travels on the same traveling lane at a constant speed, a lane changing event in which the own vehicle M changes the traveling lane thereof, an overtaking event in which the own vehicle overtakes a preceding vehicle, a following traveling event in which the own vehicle travels and follows the preceding vehicle, a merging event in which the own vehicle merges at a junction, a branching event in which the own vehicle M travels in a target direction at a branch point of the road, an emergency stop event in which the own vehicle M is stopped due to emergency, a switching event in which the automated driving operation ends and a manual driving operation starts, and the like. There is a case in which actions for avoidance may be planned on the basis of circumstances (existence of peripheral vehicles and pedestrians, lane narrowing due to road construction, and the like) of the own vehicle M while these events are executed.

The action plan generator 1123 generates a target trajectory along which the own vehicle M will travel in the future. The target trajectory is expressed by sequentially arranging arrival locations (trajectory points) of the own vehicle M. The trajectory point is a point to be reached by the own vehicle M at each predetermined travel distance and also a target speed and a target acceleration for each predetermined sampling time (for example, about 0 comma [sec]) are generated as part of the target trajectory. The trajectory point may be a position which the own vehicle M should reach at a sampling time, that is, a predetermined sampling time. In this case, the information of the target speed or the target acceleration is expressed by the interval of the trajectory points.

Figure 9:
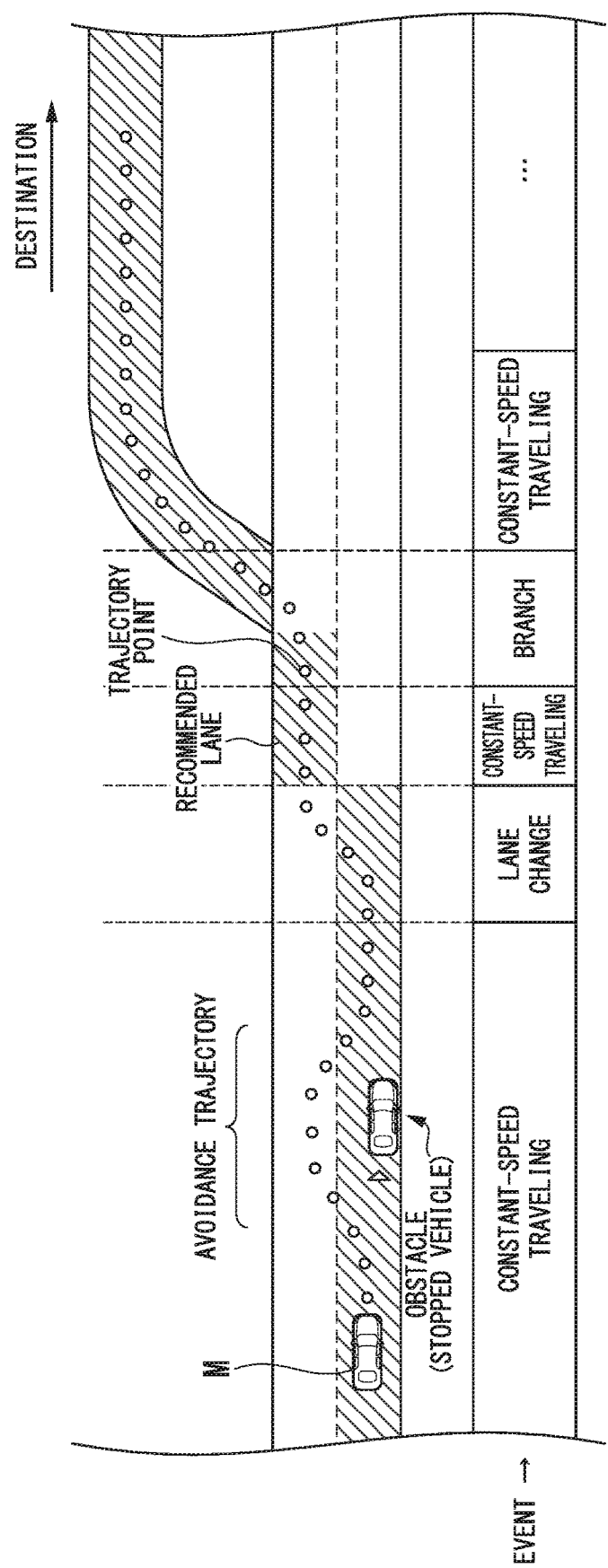
FIG. 9 is a diagram showing a state in which a target trajectory is generated on the basis of a recommended lane.

FIG. 9 is a diagram showing a state in which the target trajectory is generated on the basis of the recommended lane. As shown in the drawing, the recommended lane is set along a route to the destination so that traveling is comfortable. The action plan generator 1123 activates the lane changing event, the branching event, the merging event, and the like when the own vehicle reaches a position located at a predetermined distance (which may be determined depending on the type of event) in front of the switching point of the recommended lane. When it is necessary to avoid an obstacle while the events are executed, an avoidance trajectory is generated as shown in the drawing.

The action plan generator 1123 generates, for example, candidates of a plurality of target trajectories and selects an optimal target trajectory suitable for the route to the destination at that time point from the viewpoint of safety and efficiency.

The second controller 1140 includes, for example, a traveling controller 1141 and a switching controller 1142. The traveling controller 1141 controls the traveling driving force output device 2000, the brake device 2100, and the steering device 2200 so that the own vehicle M passes through the target trajectory generated by the action plan generator 1123 at a predicted time.

The switching controller 1142 switches the driving mode of the own vehicle M based on the action plan generated by the action plan generator 1123. The driving mode includes the automated driving mode in which the traveling driving force output device 200, the brake device 210, and the steering device 220 are controlled by the second controller 1140, and the manual driving mode in which the traveling driving force output device 200, the brake device 210, and the steering device 220 are controlled by an operation of the driving operator 1080 from a passenger.

For example, the switching controller 1142 switches the driving mode from the manual driving mode to the automated driving mode at a planned automated driving start location. The switching controller 1142 switches the driving mode from the automated driving mode to the manual driving mode at a planned automated driving end location.

The switching controller 1142 may switch the automated driving mode and the manual driving mode on the basis of, for example, a switching signal input from the mode change switch 1030a of the HMI 1030. The switching controller 1142 may switch the driving mode of the own vehicle M from the automated driving mode to the manual driving mode, for example, on the basis of operations for accelerating, decelerating, or steering the vehicle in terms of the driving operator 1080 such as an accelerator pedal, a brake pedal, and a steering wheel.

In the manual driving mode, information input from the driving operator 1080 is output to the traveling driving force output device 2000, the brake device 2100, and the steering device 2200. The information input from the driving operator 1080 may be output to the traveling driving force output device 2000, the brake device 2100, and the steering device 2200 through the automated driving controller 1000. Electronic controllers (ECUs) of the traveling driving force output device 2000, the brake device 2100, and the steering device 2200 are operated on the basis of the information input from the driving operator 1080 and the like.

The third controller 110A controls the seat peripheral device 10 similarly to the controller 110 of the seat control device 100 of the above-described first embodiment. The third controller 110A will be described in detail later.

The storage 130A is realized by, for example, a storage device such as an HDD, a flash memory, a RAM, and a ROM. The storage 130A stores neutral position information D1 and the like in addition to a program to be referred to by a processor.

The traveling driving force output device 2000 outputs a traveling driving force (torque) for allowing the own vehicle M to travel to a drive wheel. The traveling driving force output device 2000 includes, for example, a combination of an internal-combustion engine, an electric motor, and a transmission, and an ECU controlling them. The ECU controls the above-described configuration in accordance with the information input from the traveling controller 1141 or the information input from the driving operator 1080.

The brake device 2100 includes, for example, a brake caliper, a cylinder which transmits a hydraulic pressure to the brake caliper, an electric motor which generates a hydraulic pressure in the cylinder, and a brake ECU. The brake ECU controls the electric motor according to the information input from the traveling controller 1141 or the information input from the driving operator 1080 so that a brake torque corresponding to the braking operation is output to each wheel. The brake device 2100 includes a mechanism which transmits a hydraulic pressure generated by the operation of the brake pedal included in the driving operator 1080 to the cylinder via a master cylinder as a backup. The brake device 2100 is not limited to the above-described configuration, and may be an electronically controlled hydraulic brake device which transmits the hydraulic pressure of the master cylinder to the cylinder by controlling an actuator according to the information input from the traveling controller 1141 or the information input from the driving operator 1080. The brake device 2100 may include a plurality of brake devices in consideration of safety.

The steering device 2200 includes, for example, a steering ECU and an electric motor. The electric motor changes a direction of steered wheels by applying a force to, for example, a rack and pinion mechanism. The steering ECU changes the direction of the steered wheels by driving the electric motor in accordance with the information input from the traveling controller 1141 or the information input from the driving operator 1080.

Figure 10:
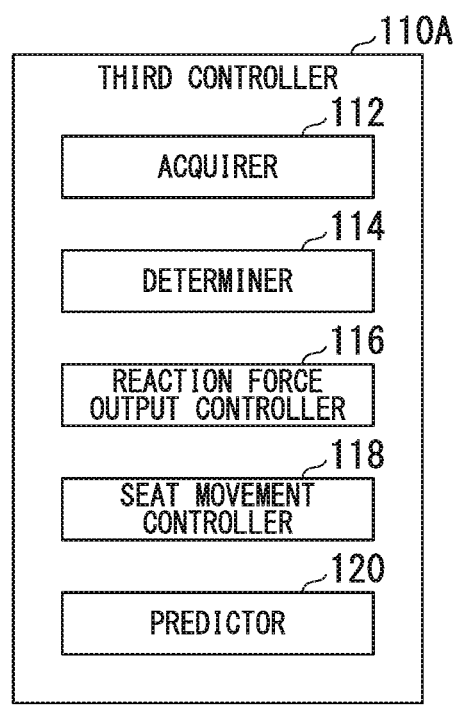
FIG. 10 is a diagram showing an example of a configuration of a third controller.

FIG. 10 is a diagram showing an example of a configuration of the third controller 110A. The third controller 110A includes, for example, the acquirer 112, the determiner 114, the reaction force output controller 116, the seat movement controller 118, and the predictor 120.

Figure 11:
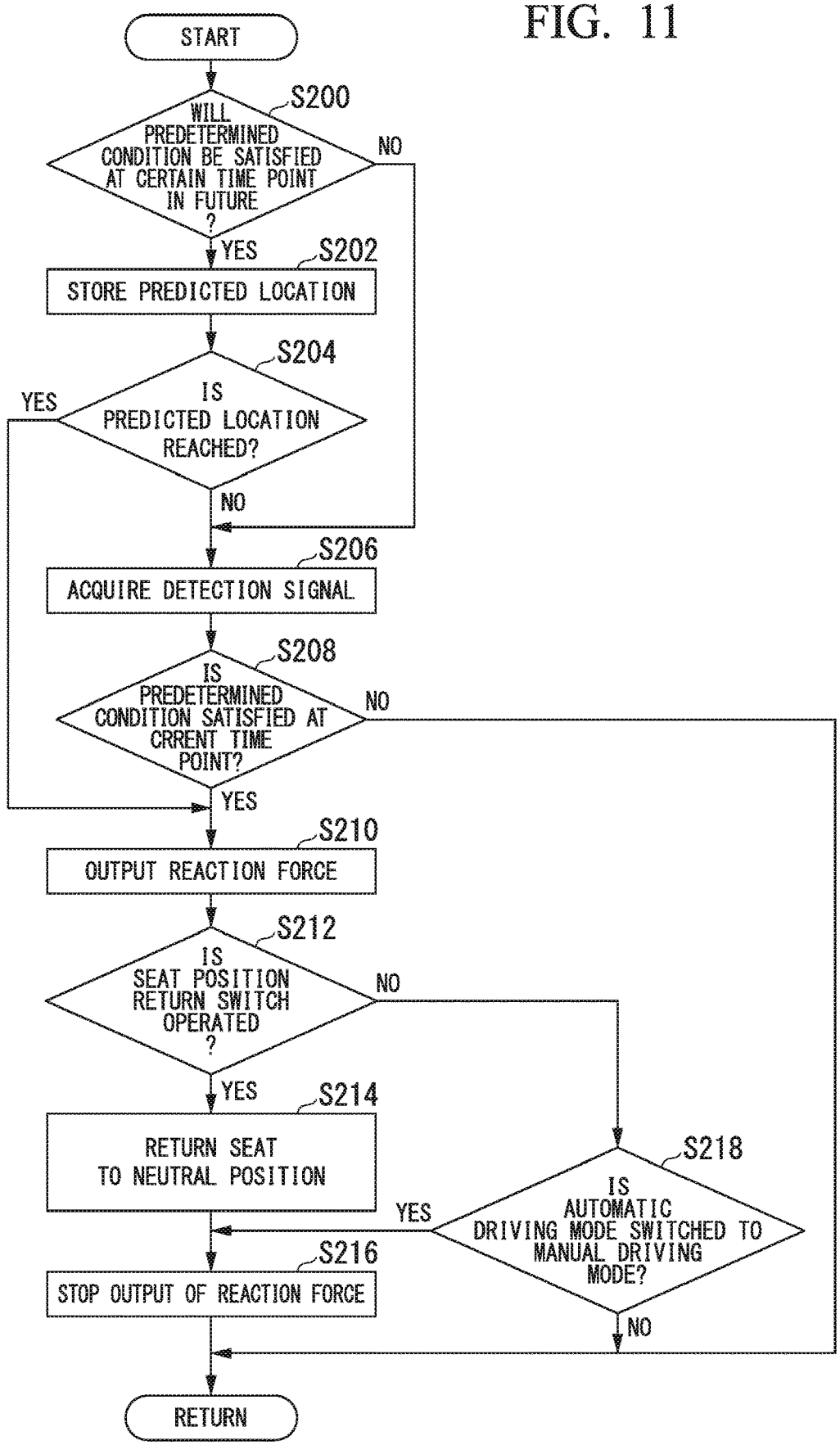
FIG. 11 is a flowchart showing a flow of a series of processes executed by the third controller of the second embodiment.

Hereinafter, a process which is executed by the third controller 110A will be described according to the flowchart. FIG. 11 is a flowchart which shows a flow of a series of processes executed by the third controller 110A of the second embodiment. The processes of the flowchart may be executed at a predetermined cycle.

First, the predictor 120 predicts (determines) whether a location satisfying a predetermined condition exists in a recommended lane (a route on which the vehicle M is scheduled to travel in the future) determined by the recommended lane determiner 1061 by referring to the second map information 1062 (step S200).

For example, the predictor 120 determines whether the inclination angle θ of the own vehicle M is greater than or equal to a predetermined angle from a gradient of the road determined as the recommended lane when the own vehicle travels on a lane. When it is determined that the inclination angle θ of the own vehicle M is greater than or equal to the predetermined angle, a predicted location at which the inclination angle θ will become greater than or equal to the predetermined angle is stored in the storage 130A (step S202). The predictor 120 determines whether to increase or decrease vehicle speed in response to a legal speed of the road determined as the recommended lane or the existence of a branch point or a junction. When it is determined that the speed V or the acceleration α of the own vehicle M is greater than or equal to a predetermined value, a predicted location at which the speed V or the acceleration α will become greater than or equal to the predetermined value may be stored in the storage 130A.

When the predictor 120 determines that a location satisfying a predetermined condition does not exist on the recommended lane, a routine moves to S206 to be described later.

Next, the determiner 114 determines whether a current position of the own vehicle M reaches the vicinity of the predicted location at which the predetermined condition will be satisfied (step S204). The "vicinity" indicates, for example, a range of several hundreds of meters in front of the own vehicle M from the predicted location.

When the determiner 114 determines that the current position of the own vehicle M reaches the vicinity of the predicted location, the routine moves to S210 to be described later.

When the current position of the own vehicle M does not reach the vicinity of the predicted location, the acquirer 112 acquires a detection signal from each sensor included in the vehicle sensor 20 (step S206). When an operation signal is output by the seat position return switch SW or a switching signal is output by the mode change switch 1030a, the acquirer 112 acquires the signal.

Next, the determiner 114 determines whether the predetermined condition is satisfied at a current time point on the basis of the detection signal acquired by the acquirer 112 (step S208). When the determiner 114 determines that the predetermined condition is not satisfied at the current time point, the processes of the flowchart end.

When the determiner 114 determines that a predetermined condition is satisfied at the current time point or the current position of the own vehicle M reaches the predicted location, the reaction force output controller 116 controls the second driver 14 so that a reaction force is output to the damper DP of the reaction force output mechanism 13 (step S210).

Figure 12:
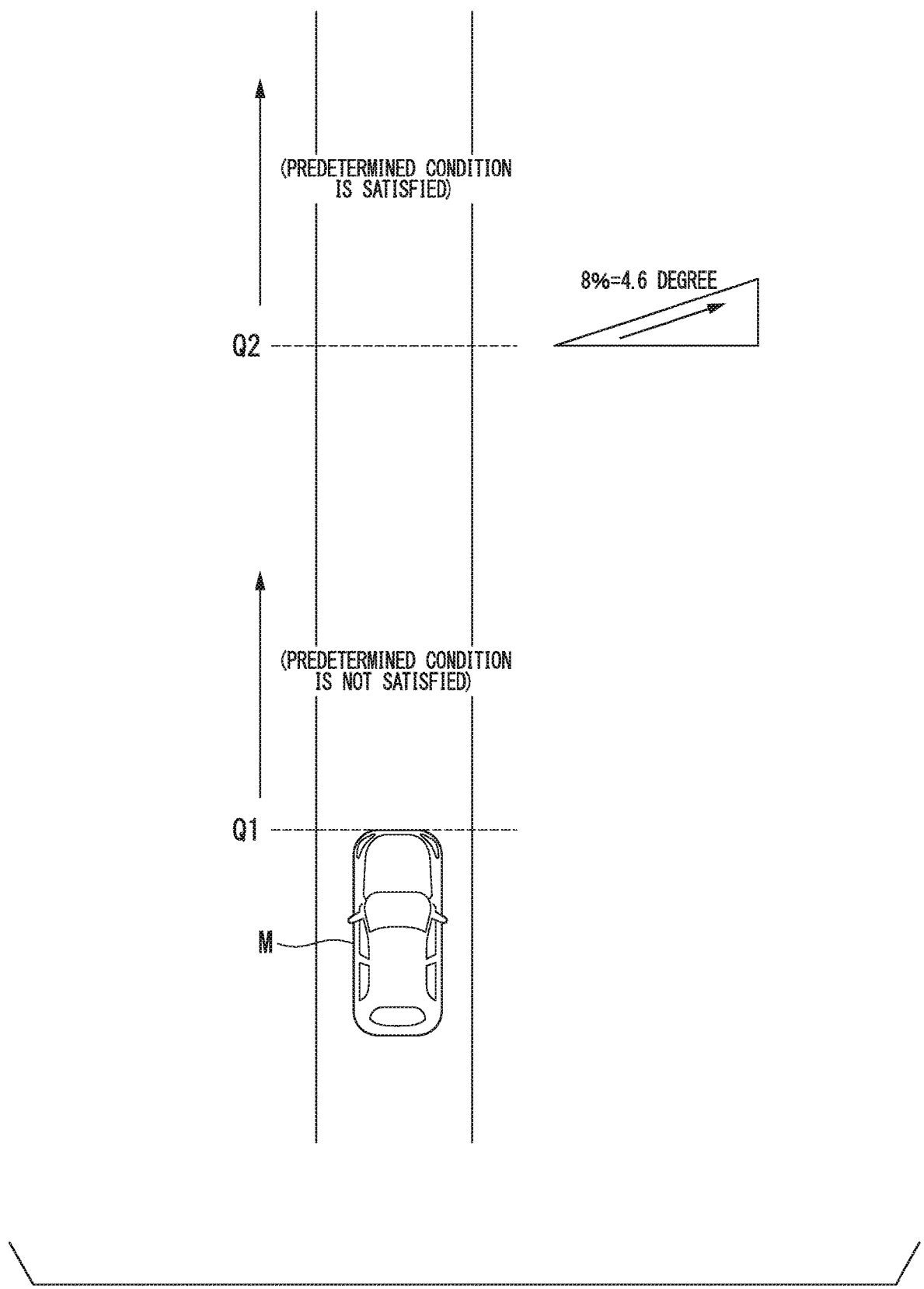
FIG. 12 is a diagram showing an example of a scene in which it is determined that a predetermined condition will be satisfied at a future time point.
Figure 13:
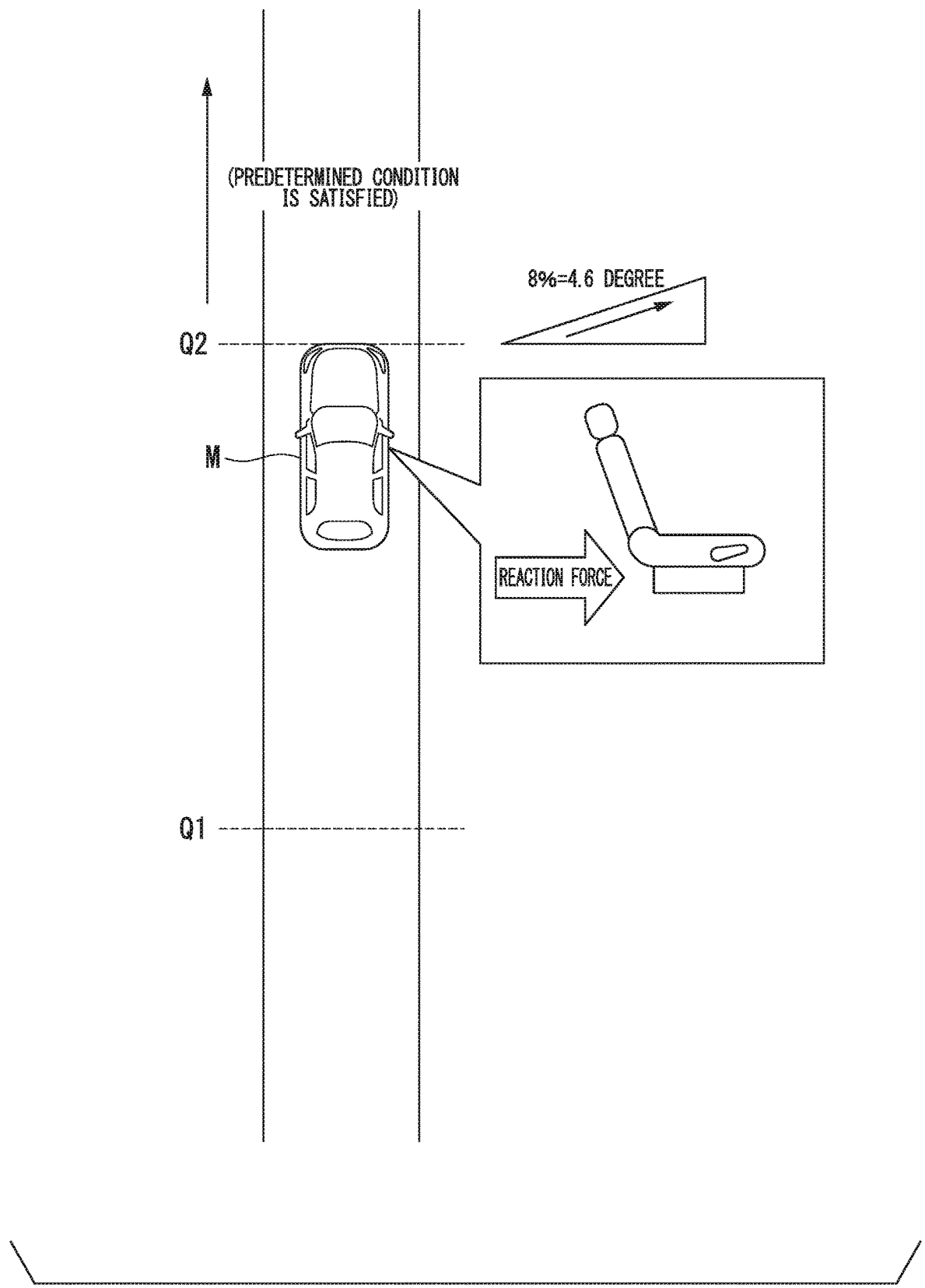
FIG. 13 is a diagram showing an example of a scene in which it is determined that a predetermined condition will be satisfied at a future time point and in which the own vehicle reaches a location at that time point.

FIG. 12 is a diagram showing an example of a scene in which it is determined that a predetermined condition will be satisfied at a future time point. FIG. 13 is a diagram showing an example of a scene in which the own vehicle M reaches a location which is determined to satisfy a predetermined condition at the future time point. For example, as shown in FIG. 12, in a case in which a gradient of a road at a location Q2 in the future is set to 4.6° and a predetermined angle is set to 4.0° when the own vehicle M is traveling through a location Q1 at a current time, the predictor 120 predicts that a predetermined condition will be satisfied at the location Q2. Then, as shown in FIG. 13, when the own vehicle M reaches the vicinity of the predicted location Q2, the reaction force output controller 116 controls the second driver 14 so that a reaction force is output to the damper DPb at the rear side of the seat ST. Accordingly, it is possible to prevent the seat ST from sliding suddenly due to its own weight or the like after being unlocked.

Next, the determiner 114 determines whether the seat position return switch SW is operated in response to whether an operation signal of the seat position return switch SW is acquired by the acquirer 112 (step S212).

For example, when the acquirer 112 acquires the operation signal of the seat position return switch SW and the determiner 114 determines that the seat position return switch SW is operated, the seat movement controller 118 returns a position and posture of the seat ST of which the seat position return switch SW is operated to a neutral position by controlling the first driver 12 with reference to the neutral position information D1 (step S214).

Next, the reaction force output controller 116 controls the second driver 14 to stop the output of the reaction force generated by the damper DP of the reaction force output mechanism 13 (step S216). The reaction force output controller 116 may simply decrease the reaction force to be output instead of stopping the output of the reaction force.

When it is not determined that the seat position return switch SW is operated, the determiner 114 determines whether the driving mode is switched from the automated driving mode to the manual driving mode or whether switching is performed within a predetermined time by the switching controller 1142 (step S218). For example, the determiner 114 may determine that the driving mode is switched from the automated driving mode to the manual driving mode when the mode change switch 1030a is operated in a case in which the driving mode is the automated driving mode, and may determine that the driving mode is switched from the automated driving mode to the manual driving mode when it is predicted that the own vehicle M will reach a predicted automated driving end location in an action plan within a predetermined time.

When the determiner 114 determines that the driving mode is switched from the automated driving mode to the manual driving mode or switching is performed, the reaction force output controller 116 controls the second driver 14 as the process in S216 so that the output of the reaction force generated by the damper DP of the reaction force output mechanism 13 is stopped. Accordingly, the processes of the flowchart end.

According to the above-described second embodiment, since the reaction force output controller 116 controls the second driver 14 so that the reaction force is output to the damper DP of the reaction force output mechanism 13 to restrict the movement of the seat ST when the predetermined condition is satisfied even when the own vehicle M is an automated driving vehicle, it is possible to suppress momentum when the seat ST is moved.

According to the above-described second embodiment, since whether a location satisfying a predetermined condition will exist on a route on which the own vehicle M is scheduled to travel in the future is predicted and a reaction force is output to the reaction force output mechanism 13 in the vicinity of the location when the location satisfying the predetermined condition exists, it is possible to suppress momentum when the seat ST is moved even when detection performance of the vehicle sensor 20 is degraded.

According to the above-described second embodiment, since the output of the reaction force is stopped or the reaction force to be output is decreased when the driving mode is switched from the automated driving mode to the manual driving mode or the driving mode is switched from the automated driving mode to the manual driving mode within a predetermined time, an operation of moving the seat ST to a position at which the passenger can easily operate the driving operator 1080 is not disturbed.

For example, there are some cases in which the passenger does not need to operate the driving operator 1080 in the automated driving mode. For that reason, the passenger rests by tilting the seat back 340 backward. At this time, when the driving mode is switched from the automated driving mode to the manual driving mode, the passenger needs to promptly return the position of the seat ST to a position at which driving is easy. At this time, since the output of the reaction force to the seat ST is stopped or the reaction force to be output is decreased, the passenger can move the seat ST to its original position without any disturbance at a time at which the position of the seat ST is adjusted.

The above-described embodiments can be expressed as below.

A seat apparatus includes: a seat on which a passenger of a vehicle sits; an inputter which is operated by the passenger; a movement mechanism which fixes a position of the seat until the inputter is operated by the passenger and allows the position of the seat to be movable in a longitudinal direction of the vehicle when the inputter is operated by the passenger; a storage which stores a program; and a processor which executes the program stored in the storage, wherein the processor executes the program to determine whether a predetermined condition related to a traveling state of the vehicle or an external environment of the vehicle is satisfied and restrict the movement of the seat in comparison to a case in which it is determined that the predetermined condition is not satisfied when it is determined that the predetermined condition is satisfied.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A seat apparatus comprising:
a seat on which a passenger of a vehicle sits;
an inputter which is operated by the passenger;
a fixer which fixes a position of the seat until the inputter is operated by the passenger and allows the position of the seat to be movable in a longitudinal direction of the vehicle when the inputter is operated by the passenger;

a reaction force output mechanism configured to output a reaction force, the reaction force being a force in a direction opposite to a direction in which the seat moves; and a reaction force output controller configured to restrict a movement of the seat by causing the reaction force output mechanism to output the reaction force, wherein the reaction force output controller causes the reaction force output mechanism to output a larger reaction force when a predetermined condition is satisfied in comparison with a case in which the predetermined condition is not satisfied, the predetermined condition being a condition related to a traveling state of the vehicle or an external environment of the vehicle.

2. The seat apparatus according to claim 1, wherein the reaction force output controller restricts the movement of the seat when the predetermined condition is satisfied and does not restrict the movement of the seat when the predetermined condition is not satisfied.

3. The seat apparatus according to claim 1, wherein the predetermined condition includes one or both of a condition in which an acceleration of the vehicle or the seat is greater than or equal to a predetermined value and a condition in which a speed of the vehicle is greater than or equal to a predetermined speed.

4. The seat apparatus according to claim 1, wherein the predetermined condition includes a condition in which an inclination angle of the vehicle is greater than or equal to a predetermined angle.

5. The seat apparatus according to claim 1, further comprising:

a recognizer configured to recognize a condition around the vehicle; and a predictor configured to predict a location at which the predetermined condition will be satisfied on a route on which the vehicle is scheduled to travel in the future by referring to a map information or a recognition result of recognizer, the map information including a road information, wherein the reaction force output controller restricts the movement of the seat when the vehicle reaches a vicinity of the location predicted by the predictor.

6. The seat apparatus according to claim 1, further comprising:

a switching controller configured to switch a vehicle driving mode to any one of an automated driving mode in which at least one of a vehicle steering operation and a vehicle speed acceleration and deceleration operation is controlled and a manual driving mode in which both the vehicle steering operation and the vehicle speed acceleration and deceleration operation are controlled by an operation of the passenger, wherein the reaction force output controller does not restrict the movement of the seat in comparison to the case in which the predetermined condition is not satisfied even when the predetermined condition is satisfied when the driving mode is switched from the automated driving mode to the manual driving mode by the switching controller.

7. The seat apparatus according to claim 1, further comprising:

a return switch which is installed at a position different from the inputter; and a movement controller configured to allow the position of the seat to be movable in the longitudinal direction of the vehicle and move the position of the seat to a predetermined position by controlling the fixer when the return switch is operated, wherein the reaction force output controller does not restrict the movement of the seat in comparison to the case in which the predetermined condition is not satisfied even when the predetermined condition is satisfied while the seat is being moved by the movement controller.

8. The seat apparatus according to claim 7, wherein the return switch is installed at a side support provided at both sides of a seat cushion.

* * * * *